Patented Nov. 30, 1948

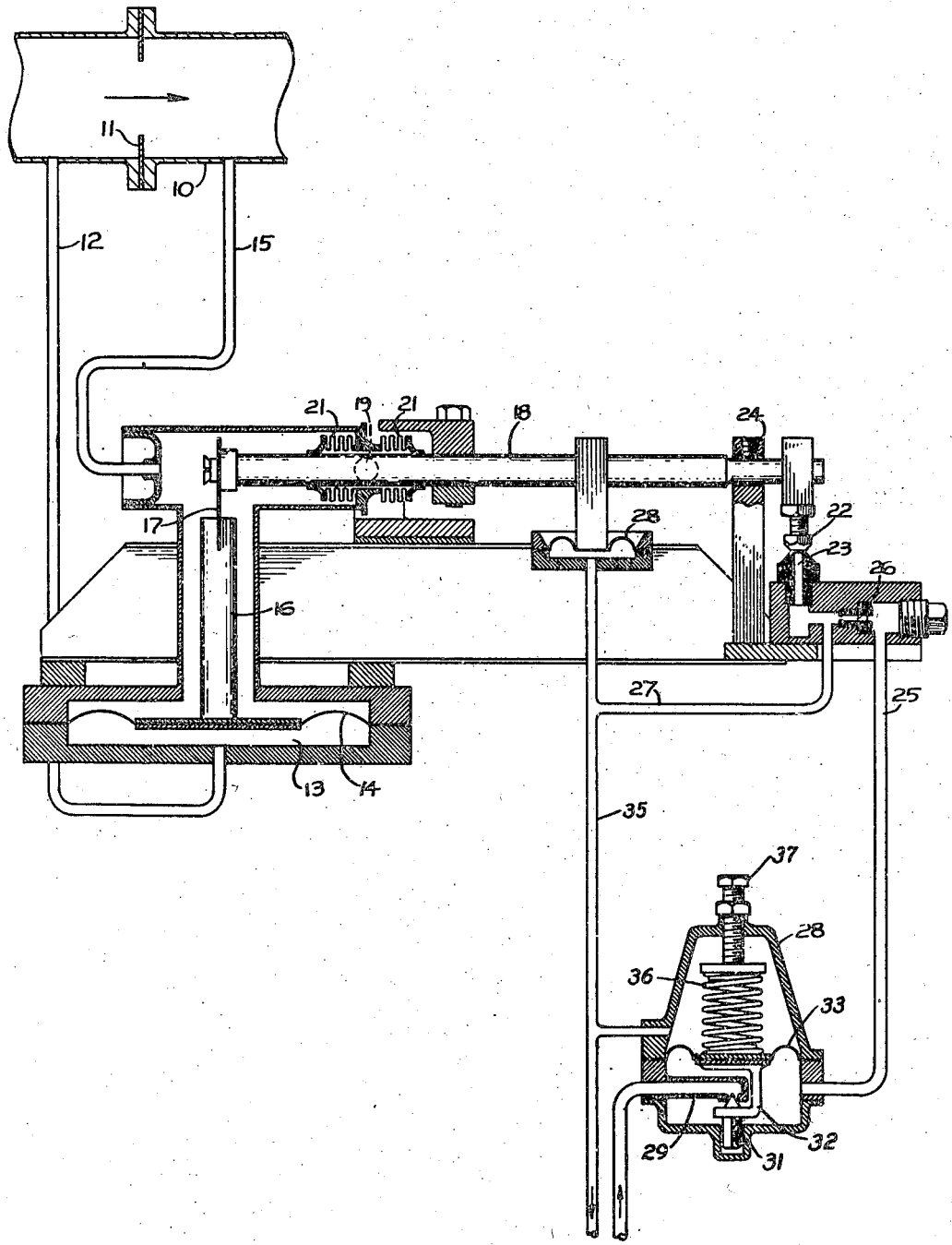

2,454,946

UNITED STATES PATENT OFFICE 2,454,946

PRESSURE TRANSMITTING INSTRUMENT

Albert J. Rosenberger, Chicago, Ill., assignor to Republic Flow Meters Company, Chicago, Ill., a corporation of Illinois Application March 22, 1944, Serial No. 527,525

5 Claims. (Cl. 137—153)

This invention relates to pressure transmitting instruments and more particularly to instruments for producing a regulating pressure for indication or control in response to variations in a condition.

It has heretofore been proposed to use a valve couple of the supply and waste type to produce a regulated pressure for indicating or control purposes. Such valves are normally supplied with fluid under constant pressure and when so used have a relatively large travel to produce a given pressure change in certain parts of their range and a much smaller travel to produce the same pressure change in other parts of their range. Their operating characteristics are thus very irregular.

It is one of the objects of the present invention to produce a pressure transmitting instrument in which the valve characteristics are substantially constant throughout the entire operating range.

Another object of the invention is to provide a pressure transmitting instrument in which the supply pressure is varied in accordance with the regulating pressure.

The above and other objects and advantages will be more readily apparent from the following description when read in connection with the accompanying drawing, in which the single figure is a diagrammatic view with parts in section of an instrument embodying the invention.

The instrument shown is adapted to provide a regulated pressure for indicating or control purposes in response to variations in the flow through a conduit 10 provided with an orifice 11. The inlet side of the orifice is connected through a pipe 12 to a chamber 13 below a flexible diaphragm 14 and the space on the upper side of the diaphragm is connected through a pipe 15 to the opposite side of the orifice. The diaphragm carries a post 16 connected through a flexible strip 17 to one end of a balance lever or weigh beam 18 which is pivoted at 19. The beam may be sealed around the pivot by flexible bellows 21 to prevent the escape of fluid while permitting free movement of the beam.

The beam carries at its free end a valve member 22 movable toward and away from a nozzle 23 to vary the back pressure in the nozzle. Movement of the beam is limited by a support 24 having an opening therein through which the end of the beam extends.

The nozzle 23 is supplied with fluid under pressure from a conduit 25 connected to the nozzle through a restriction 26. Back pressure on the nozzle is transmitting through a conduit 27 to the lower side of a flexible diaphragm 28 connected to the beam 18 to oppose the tilting force thereon exerted by the diaphragm 14.

In order to regulate the supply pressure to the nozzle and to vary it in accordance with variations in the regulated pressure, a valve is provided in the supply conduit 25. As shown, the valve comprises a fixed orifice member 29 and a needle valve 31 movable toward and away from the orifice to restrict the flow therethrough. The needle valve 31 is carried by a bracket 32 connected to a flexible diaphragm 33 which is exposed on its lower surface to the supply pressure in the conduit 25. The valve 31 is guided by a non-circular projection thereon slidable in a cylindrical cavity in the valve housing.

The upper side of the diaphragm is connected through a conduit 35 to the regulated pressure pipe 27. Preferably a coil spring 36 is mounted above the diaphragm to urge it downwardly. The setting of the coil spring may be adjusted through a screw 37 in the top of the valve casing.

In operation an increase in the differential pressure across the diaphragm 14 urges the weigh beam 18 clockwise to increase the restriction of the nozzle 23 and increase the regulated pressure in the conduit 27. The force of the diaphragm 13 is balanced by the regulated pressure acting through the diaphragm 28 so that the regulated pressure will always be proportional to the differential across the diaphragm 14. The regulated pressure added to the pressure of spring 36 acting on the upper surface of the diaphragm 33 controls the valve 31 so that the pressure of fluid supplied to the nozzle will always be proportional to the regulated pressure plus the pressure of the spring 36.

Upon a change in flow conditions through the conduit 10 the differential across the diaphragm 14 will be varied to adjust the valve member 22 and change the regulated pressure. For example, an increase in flow will increase the differential across the diaphragm 14 to move the valve member 22 toward the nozzle. This increases the regulated pressure acting on the diaphragm 28 until the increased differential across diaphragm 14 is rebalanced. The increased regulated pressure acting on the diaphragm 33 tends to open the valve 31 to increase the supply pressure in conduit 25. Thus the supply pressure will be varied each time the regulated pressure varies so that as the control valve 22—23 is more nearly closed to produce a high regulated pressure a high supply pressure will be provided. Conversely when the valve member 22—23 is opened to decrease the regulated pressure, the supply pressure will be correspondingly decreased. When the control valve member is opened to the maximum extent to provide minimum regulated pressure, the supply pressure will be only sufficient to balance the spring 36.

With a constant supply pressure it will be seen that a much greater movement of the control valve is required to produce a given variation in the regulated pressure when the valve is nearly open than when it is nearly closed. This is due to the fact that the quantity of air by weight flowing through the orifice 26 increases as the square root of the pressure drop across the orifice so that at low regulated pressures, a large change in effective area of the nozzle 23 is required to accommodate the large increase in volume resulting from the increased weight of air and increased volume per pound at the pressure drop. However, when the supply pressure is varied with the regulating pressure in accordance with the present invention, a given movement of the control valve will produce a substantially equal change in regulated pressure throughout the full range. This is because the pressure drop across the orifice 26 is held substantially constant so that a uniform volume of air flows through the orifice at all times resulting in a substantially smaller mass of air through the nozzle 23 at low pressures.

Variation of the supply pressure in proportion to the regulated pressure provides a substantially straight line operating characteristic for the instrument with a given movement of the control valve producing a given change in pressure in all positions so that it can have a substantially straight line calibration throughout its range. It further enables the instrument to respond accurately to differential pressures across the diaphragm 14 approaching zero very closely to produce in effect a zero regulated pressure since the supply pressure also approaches zero.

While one embodiment of the invention has been shown and described in detail herein, it will be understood that this is illustrative only and is not intended as a definition of the scope of the invention, reference being had for that purpose to the appended claims.

What is claimed is:

1. A pressure transmitting instrument comprising a control valve for producing a regulated fluid pressure, means responsive to a condition to be measured to control the valve, a supply connection to the valve, a valve in the supply connection, a restricted orifice in the supply connection between the valves, a diaphragm connected to the last named valve to control it, one side of the diaphragm being open to the supply connection between the last named valve and the orifice to urge the last named valve closed, and a connection to supply regulated pressure from the control valve to the other side of the diaphragm to urge the last named valve open.

2. A pressure transmitting instrument comprising a control valve for producing a regulated fluid pressure, means responsive to a condition to be measured to control the valve, a supply connection to the valve, a valve in the supply connection, a restricted orifice in the supply connection between the valves, a diaphragm connected to the last named valve to control it, one side of the diaphragm being open to the supply connection between the last named valve and the orifice to urge the last named valve closed, a connection to supply regulated pressure from the control valve to the other side of the diaphragm to urge the last named valve open, and a spring acting on said other side of the diaphragm.

3. A pressure transmitting instrument comprising a balance member, means responsive to a condition to be measured to urge the member in one direction, a control valve operated by the balance member to produce a regulated pressure, means responsive to the regulated pressure to urge the balance member in the other direction, a supply connection to the control valve, a valve in the supply connection, a restricted orifice in the supply connection between the valves, a diaphragm connected to the last named valve to control it, one side of the diaphragm being open to the supply connection between the orifice and the last named valve to urge the valve closed, and a connection to supply regulated pressure from the control valve to the other side of the diaphragm to urge the last named valve open.

4. A pressure transmitting instrument comprising a balance beam, a nozzle mounted adjacent the beam, a valve member movable toward and away from the nozzle by the beam to produce a regulated pressure in the nozzle, means responsive to a condition to be measured for urging the beam in one direction, means connected to the nozzle to urge the beam in the other direction in response to the regulated pressure, a supply conduit connected to the nozzle, a restricted orifice in the supply conduit, a valve in the supply conduit anterior to the orifice, and means responsive to the difference between the pressure in the supply conduit between the orifice and the last named valve and the regulated pressure to control the valve.

5. A pressure transmitting instrument comprising a control valve for producing a regulated control fluid pressure, means responsive to a condition to be measured to control the valve, a supply connection to the valve, a restricted orifice in the supply connection, and a regulating device in the supply connection anterior to the orifice connected to the control valve to vary the pressure delivered to the orifice, the regulating device being responsive to the control fluid pressure and the delivered pressure to maintain a constant differential therebetween.

ALBERT J. ROSENBERGER.

REFERENCES CITED

The following references are of record in the file of this patent:

UNITED STATES PATENTS

| Number | Name | Date |
|---|---|---|
| 1,954,514 | Beck | Apr. 10, 1934 |
| 2,117,800 | Harrison | May 17, 1938 |
| 2,264,261 | Erbguth | Nov. 25, 1941 |
| 2,359,236 | Moore | Sept. 26, 1944 |